US000001170H

United States Statutory Invention Registration [19]

[11] Reg. Number: H1170

Purdy

[43] Published: Apr. 6, 1993

[54] VOLATILE DIVALENT DOUBLE METAL ALKOXIDES

[75] Inventor: Andrew Purdy, Alexandria, Va.

[73] Assignee: United States of America, Washington, D.C.

[21] Appl. No.: 387,047

[22] Filed: Jul. 31, 1989

[51] Int. Cl.[5] ..... C07F 1/08

[52] U.S. Cl. ..... 556/113; 556/110; 505/811; 505/819; 427/62; 427/69

[58] Field of Search ..... 556/110, 113; 505/1, 505/734, 801, 802, 810, 811, 818, 819; 427/62, 63, 69

[56] References Cited

U.S. PATENT DOCUMENTS

| | | | |
|---|---|---|---|
| 3,914,266 | 10/1978 | Hay | 556/110 |
| 3,933,878 | 1/1976 | Tyler, III et al. | 556/110 X |
| 4,287,190 | 9/1981 | Boettcher et al. | 556/113 X |
| 4,717,584 | 1/1989 | Aoki | 427/38 |
| 4,847,239 | 7/1989 | Piotrowski et al. | 556/113 X |
| 4,866,031 | 9/1989 | Bolt et al. | 505/1 |
| 4,923,849 | 5/1990 | Sherif | 505/1 |
| 4,982,019 | 1/1991 | Purdy et al. | 505/1 X |
| 5,001,110 | 3/1991 | Nonaka et al. | 505/734 X |
| 5,004,720 | 4/1991 | Kobayashi et al. | 505/734 X |
| 5,011,822 | 4/1991 | Barder | 505/1 |
| 5,024,991 | 6/1991 | Tsunashima et al. | 505/734 X |
| 5,026,684 | 6/1991 | Baney et al. | 505/1 |

OTHER PUBLICATIONS

Bradley et al., Metal Alkoxides, 1978, pp. 299-334.

Brubaker et al., J. Inorganic Nucl. Chem., vol. 27, pp. 59-62 (1965) Pergamon Press, Northern Ireland.

Singh et al., Z. Inorg. Hg. Chem., vol. 477, pp. 235-240 (1981).

Adams et al., The Aust. J. Chem., vol. 19, pp. 207-210 (1966).

Dubey et al., J. Inorganometallic, vol. 341, pp. 569-574 (1988).

Golvil et al., J. Itac. Inorg. Metal-Org. Chem., vol. 5, pp. 267-277 (1975).

Jeffries et al., Chemistry of Materials, vol. 1, pp. 8-10 (1989).

Yamane et al., Chemistry Letter (Japan), pp. 1515-1516 (1988).

Yamane et al., Chemistry Letters (Japan), pp. 939-940 (1988).

*Primary Examiner*—Robert L. Stoll
*Assistant Examiner*—Joseph D. Anthony
*Attorney, Agent, or Firm*—Thomas E. McDonnell

[57] ABSTRACT

The invention relates to volatile mixed metal alkoxides of the formula $M'_xM_yCu_z(OR)_{x+2(y+z)}$ wherein M is selected from the group consisting of Ba, Sr, and Ca, M' is an alkali metal, x=0-6, y=0-4 and z=1 to 6, and x and y are not 0 at the same time, and R is selected from the group consisting of $CMe_3$, $CMe_2Et$, $CMeEt_2$, $CMe_2Pr$, CMeEtPr, $CEt_3$ or combinations of these substituents. Volatile alkoxides of Y and Cu are known. These volatile alkoxides can be used in a CVD process where stoichiometric quantities of the material are sublimated, transported to a substrate and decomposed to an oxide with or without the presence of oxygen. The oxides are then treated in a known manner to produce the superconducting film.

11 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VOLATILE DIVALENT DOUBLE METAL ALKOXIDES

BACKGROUND OF THE INVENTION

1. Field of the Invention

This invention relates to volatile divalent mixed metal alkoxides useful for the CVD deposition of metal oxides to a substrate. More particularly, this invention relates to volatile mixed metal alkoxides of barium, strontium, or calcium with copper used to deposit oxides used to make thin, superconducting copper oxide films.

2. Description of the Prior Art

The utility of copper oxides of barium, strontium, or calcium as superconducting materials are well known. Difficulty exists in preparing uniform, consistent, thin films of these superconducting materials. By uniform is meant both uniform in thickness of the layer of material deposited and uniform in the chemical makeup of the layer deposited. By consistent is meant that the uniformity of the film is consistent for each run or application of a coating layer.

Chemical vapor deposition (CVD) is a well known method used in the optical fiber and semiconductor field for depositing uniform and consistent films of material. A CVD process requires fairly volatile precursors for the oxides of the thin film. This has been a problem in making superconducting films of superconducting materials containing barium, strontium, or calcium because few volatile precursors of these oxides are known or suggested for this purpose.

Bunker et al., in U.S. Pat. No. 4,839,339, describes a precipitation method of making superconductor precursor mixtures. In the description of the state of the art, Bunker et al. notes that many methods of preparing superconductor mixed-oxides have been tried including CVD. Bunker avoids CVD and describes another process.

Metal Alkoxides of the superconducting elements have been used to make superconductor, particularly the copper oxides including $Y_1Ba_2Cu_3O_7$. The metal alkoxides are used in a solution or in gel form as described by Fahrenholtz et al., Preparation of $YBa_2Cu_3O_{7-\delta}$ from Homogeneous Metal Alkoxide Solution, pp. 141–147; and Laine et al., Organometallic Precursors for the Fabrication of High $T_c$ Superconducting Fibers, pp. 450–455, both published in *Research Update*, 1988, *CERAMIC SUPERCONDUCTORS II*, Edited by Man F. Yan, American Ceramics Society, Inc, Westervill, Ohio; G. Moore et al., Sol-Gel Processing of $Y_1Ba_2Cu_3O_{7-x}$ Using Alkoxide Precursors: Two Systems Yielding High Degree of Thin Film Orientation and Crystal Growth, *MATERIALS LETTERS*, Vol 7, No. 12, pp. 415–424, March 1989; Horowitz et al, Submicrometer Superconducting $YBa_2Cu_3O_{6+x}$ Particles Made by a Low-Temperature Synthetic Route, *SCIENCE*, Vol. 243, pp. 66–69, 6 Jan. 1989, to prepare the copper oxide of the superconducting composition. At page 141, Fahrenholtz noted the problems with preparing superconductor thin films of the copper oxides.

Berry et al. reported making superconductor films by CVD. See Berry, A. D.; Gaskill, D. K.; Holm, R. T.; Cukauskas, E. J.; Kaplan, R.; Henry, R. L. Appl. Phys. Lett. 52(20), pp. 1743 (1988). Yamane et al. have also reported the preparation of $YBa_2Cu_3O_{7-x}$ films by CVD. The volatile precursor are metal chelates. See Yamane et al., Preparation of $YBa_2Cu_3O_{7-x}$ Films by Chemical Vapor Deposition, *CHEMISTRY LETTERS*, pp. 939–940, 1988. Yamane et al. also reports the preparation of BiSrCaCuO films by CVD. See Yamane at al., Preparation of Bi-Sr-Ca-Cu-0 Films by Chemical Vapor Deposition with Metal chelate and Alkoxide, *CHEMISTRY LETTERS*, PP. 1515–1516, 1988. Shinohara et al. has reported the CVD of superconducting Y-Ba-Cu-O using a fluorine containing precursors. Initially, fluoride films are deposited and subsequently converted to the oxide with water vapor. See Shinohara, K.; Munahata, F.; Yamanaha, M., *Japn. J. Appl. Phys.* 27(9), L1683, (1988).

Studies have been made of the alkoxides, but there is a tendency for the compounds to be nonvolatile and insoluble as reported by Adams et al., Magnetism, Electronic Spectra, and Structure of Transition Metal Alkoxides, *Aust. J. Chem*, Vol 19, pp. 207–10, 1966. Volatile Cu I alkoxides are known. Cuprous tert- Butoxide *J. Am. Chem. Soc.*, Vol. 94:2, pp. 658–659, Jan. 26, 1972. Some volatile double ethoxides are known. Govil et al., Some Double Ethoxides of Alkaline Earth Metals With Aluminum. *SYN. REACT. INORG. METAL-ORG. CHEM.*, Vol. 5(4), pp. 267–277 (1975).

In U.S. Pat. No. 4,717,584, Aoki et al. reports the preparation of magnetic thin films by plasma CVD using metal alkoxides including diethoxy, dipropoxy and dibutoxy barium and strontium. In the Aoki process, argon is bubbled through an alcohol solution of the alkoxides. The stream of argon, presumably saturated with alkoxide and alcohol, is conducted to a substrate where the alkoxide is deposited. A plasma is used to decompose the alkoxides to magnetic oxides.

As reported in the text *METAL ALKOXIDES*, Bradley et al., Academic Press New York, 1978, at pages 46–50, the alkoxides of most metals and the alkali metals and the Grcup II metals, such as Ba in particular, are not volatile and often decompose. The double metal alkoxides are discussed in chapter 5, pages 299–334. A number of double metal alkoxide containing copper are known including $Cu[Al(OR)_4]_2$, Stump and Hillebrand, *Z. Natursch*, 34*b*, pp. 262–265 (1979); $ClCuM(OR)_9$ [M=Zr, Ta]; Dike et al. *J. Organomet. Chem.*, 1988, 341, pp. 569–574; $Cu[M(OR)_6]$ [M=Ta or Nb], Dike et al., *Trans. Met. Chem*, 1985, 10, pp. 473–476; $CuZr(OR)_9$, Dike, et al., *Polyhedron*, 1987, 6(3), pp. 427–433. but none reported to date contain barium, calcium, or strontium, or the alkali metals. The mixed hydroxide $Na_2Cu(OH)_4$ is reported by Riou et al., *Acta Cryst.* 1989, C45, pp. 374–376. Some of the alkoxides are volatile such as $NaOBu^t$, Na and K fluorinated alkoxides, but writers in the field expected the stability of the alkoxides to decrease as the atomic weight of the metal atom increases. See Dear et al., VOLATILE FLUORINATED ALKOXIDES OF THE ALKALI METALS, *Inorganic Chemistry*, Vol 9, pp. 2590–2591, (1970) at p. 2591. A problem exists in providing a volatile precursor for barium, calcium and strontium which provides uniform, consistent films of superconducting films on substrates.

SUMMARY OF THE INVENTION

Accordingly, it is an object of this invention to have volatile compounds of Ba, Ca, Sr, and Cu suitable for use in the CVD preparation of superconducting films.

Further, it is an object of this invention to have compounds with sufficient volatility to be transported under vacuum to the decomposition site in a CVD process.

In addition, it is an object of this invention to have a compound with sufficient thermal stability for the precursor molecules to arrive at the decomposition site intact.

Yet another object of this invention is to have compounds which cleanly, reproducibly and homogeneously decompose to the desired oxide in the proper elemental ratios.

Another object of this invention is to have compounds which can be transported to the deposition site without introducing undesirable elements which could contaminate the oxide film.

These and additional objects of the invention are accomplished by volatile mixed metal alkoxides of the formula $M'_xM_yCu_z(OR)_{x+2(y+z)}$ wherein M is selected from the group consisting of Ba, Sr, and Ca, M' is an alkali metal, x=0–6, y=0–4 and z=1 to 6, and x and y are not 0 at the same time, and R is selected from the group consisting of $CMe_3$, $CMe_2Et$, $CMeEt_2$, $CMe_2Pr$, CMeEtPr, $CEt_3$ or combinations of these substituents. Volatile alkoxides of Y and Cu are known. These volatile alkoxides can be used in a CVD process where stoichiometric quantities of the material are sublimated, transported to a substrate and decomposed to an oxide with or without the presence of oxygen. The oxides are then treated in a known manner to produce the superconducting film.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

There has been considerable interest in recent years in the development of new precursors for the chemical vapor deposition (CVD) of inorganic materials. In general, such precursors must be volatile, have sufficient stability to transport to the deposition site, and decompose cleanly giving the desired material. Excellent compounds for this purpose are the volatile alkoxides of the formula $M'_xM_yCu_z(OR)_{x+2(y+z)}$ wherein M is selected from the group consisting of Ba, Sr, and Ca, M' is an alkali metal, x=0–6, y=0–4 and z=1 to 6, and x and y are not 0 at the same time, and R is selected from the group consisting of $CMe_3$, $CMe_2Et$, $CMeEt_2$, $CMe_2Pr$, CMeEtPr, $CEt_3$ or combinations of these substituents.

The double metal alkoxides can be prepared by the standard techniques of reacting the metal halide with sodium alkoxide according to the following reaction scheme.

$$3\ NaOCMe_3 + CuCl_2 \rightarrow NaCu(OCMe_3)_3 + 2NaCl$$

$$2\ NaCu(OCMe_3)_3 + BaBr_2 \rightarrow BaCu_2(OCMe_3)_6 + 2NaBr$$

These compounds may also be prepared by reaction of their components M'OR, $M(OR)_2$ and $Cu(OR)_2$. Purification is typically accomplished by sublimation or recrystallization.

These alkoxides have good volatility between about 70° and 170° C. making these alkoxides excellent precursors for use in a CVD process where the precursor is heated to create a vapor. Particularly useful are the compounds $M_yCu_z(OR)_{2(y+z)}$, $M'_xCu_z(OR)_x+2z$. Most effective compounds recognized at this time are $BaCu(OCMe_3)_4$, $BaCu_2(OCMe_3)_6$, $NaCu(OCMe_3)_3$, $NaCu(OCEt_3)(OCMe_3)_2$.

Figure 1:
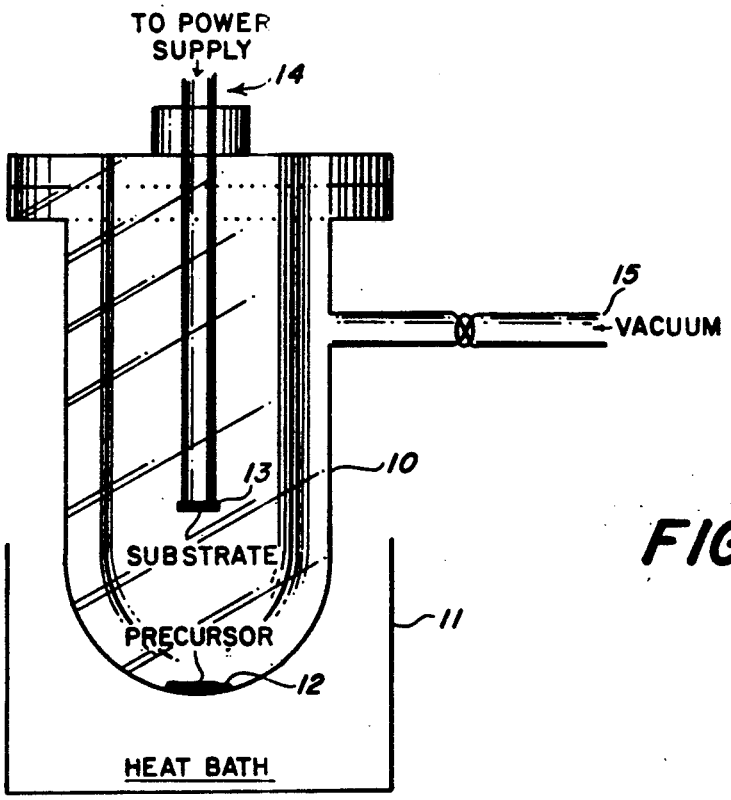
FIG. 1 is a CVD reactor for vacuum use.

In use, the alkoxides 12 of the desired superconductor are placed in the bottom of a CVD reactor 10 as shown in FIG. 1. The alkoxides are mixed in a ratio to provide the desired stoichiometric proportions of the metals. Alternatively, separate containers of each precursor can be placed in the CVD reactor. The mixed alkoxides (precursor) are heated by the bath 11 to a temperature sufficient to cause the sublimation of all the precursor materials at the desired rate. A vacuum 15 is applied. A substrate 13 is mounted above the precursor. The substrate 13 is heated by power supply 14 sufficiently to cause the precursor vapors to decompose to the oxide as soon as the precursors impinge upon the substrate surface. The substrate can be any substrate usually used with superconducting materials or electronic devices. These include silicon chips, quartz, $SiO_2$ chips, $GeO_2$ chips, zirconium oxide etc. The end product is a substrate coated with a layer of oxide materials which is subsequently treated or annealed to produce a layer of superconducting material.

Figure 2:
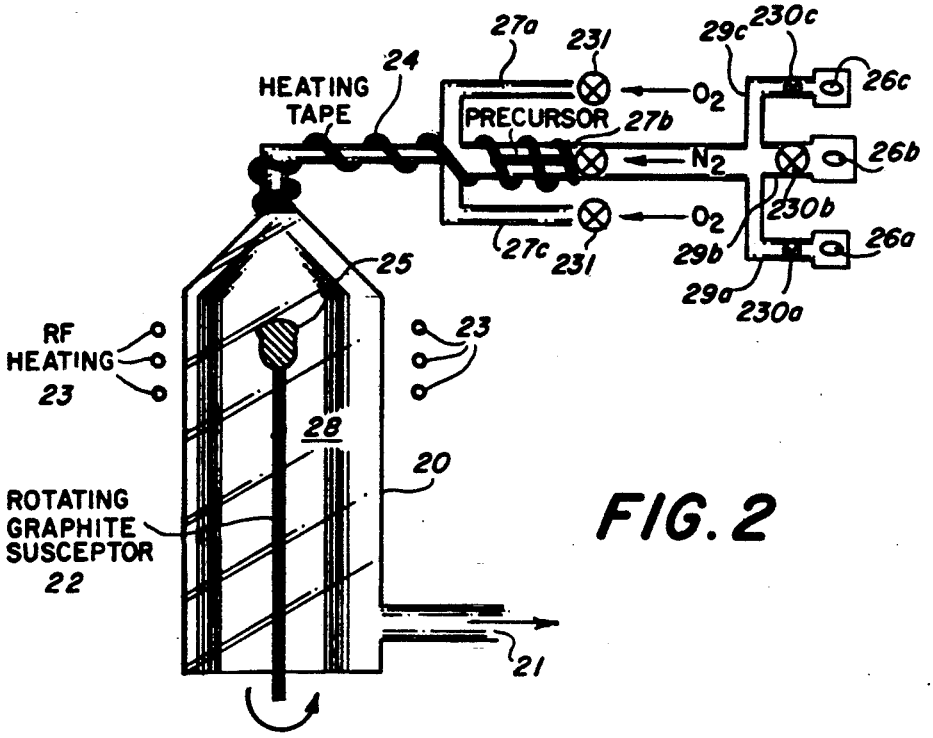
FIG. 2 is an alternate CVD reactor.

Alternatively, other CVD apparatus, such as illustrated in FIG. 2 can be used. The CVD reactor 20 is attached to a vacuum apparatus via conduit 21. The reactor 20 has a chamber 28. The chamber is heated by RF coil 23 to prevent the precipitation of the precursor or oxide on the chamber walls. A conduit 26 is connected to the chamber 28 so that oxygen and precursor may be conducted to the chamber 28. The conduit 26 is kept warm by heating tape 24 or any other heating means to avoid premature condensation of precursor. The conduit 26 is fed from the manifold 27 which contains multiple feed tubes 27 *a, b* etc. At least one tube carries oxygen and another carries precursor. The precursor is generated in chambers 26 *a, b,* etc. by heating the respective precursor above the sublimation point. A separate chamber can be used for each precursor. A neutral carrier gas can be flowed through the chambers 26 at rate sufficient to move the precursor. The stoichiometric proportions of the respective precursors can be controlled by valves 230 in manifold 29. In the alternative, a premixed combination of precursors can be placed in the manifold 27 and evaporated together. A substrate 25 is mounted on the rotating graphite susceptor 22. The precursor vapors enter the chamber 28, deposit on the substrate 25 and decompose to the oxide as a result of the energy generated by the RF heater 23. The flow rate of the carrier gas and oxygen in the chamber 28 can be controlled by valves 231. The superconductor coated substrate can be treated by known techniques in the chamber.

Figure 3:
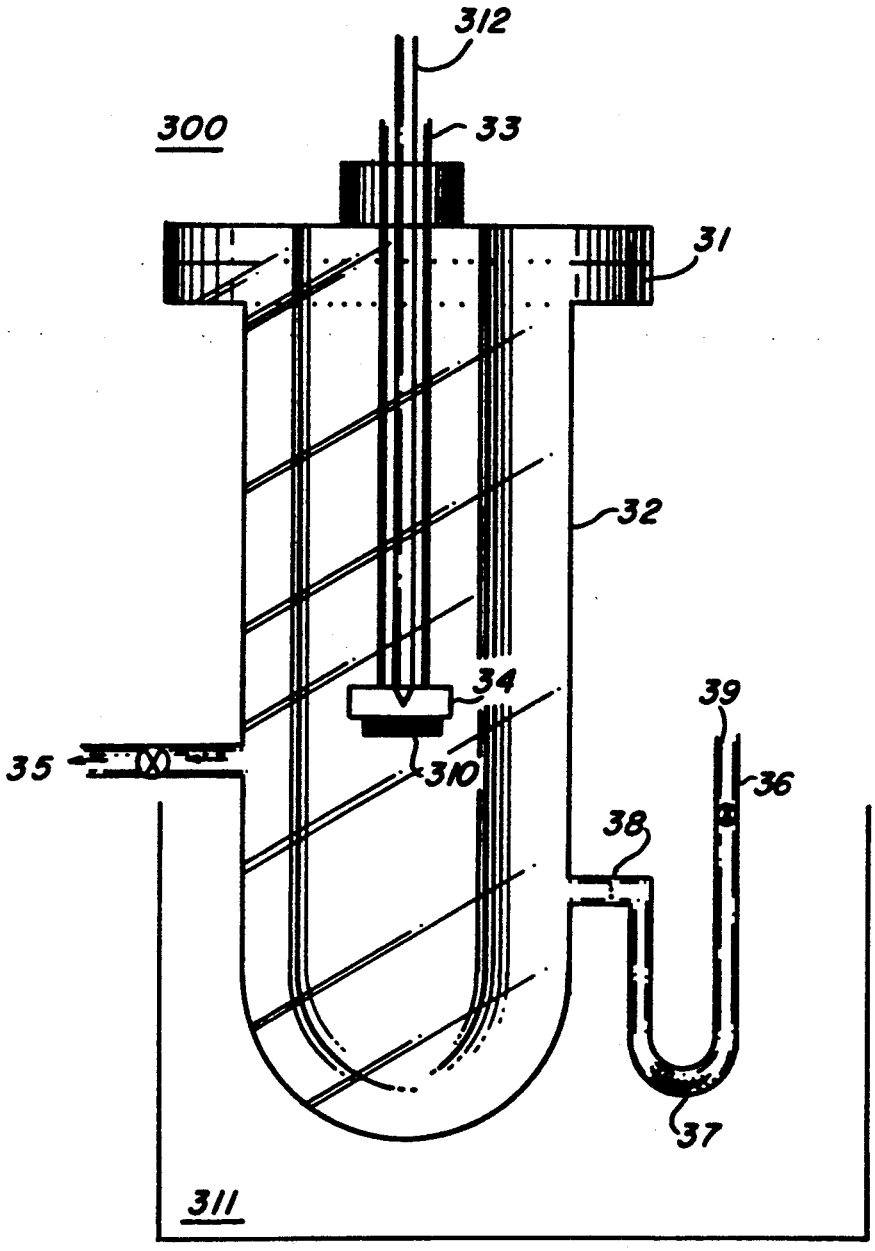
FIG. 3 is a second alternate CVD reactor.

Another CVD reactor 300 is shown in FIG. 3 where 31 is the flange of the reactor 32. Power leads 33 heat metal block 34 on which the substrate 310 is attached. Vacuum is applied to the system through conduit 35. The precursor 37 is located in tube 36 through which an inert carrier gas 39 is flowed evaporating the precursor and carrying it to the reactor 32. The coarse glass frit 38 filters the vapors of the precursor entering the reactor 32. The reactor is mounted in a heating bath 311. The temperature of the metal mounting block 34 is controlled by the thermocouple 312. In principal, this device works in the same manner as the two other alternative CVD systems.

These mixed alkoxides also have different solubility properties than the single Group II and Cu II alkoxides. Specifically, Ca, Sr, Ba and Cu II alkoxides are typically insoluble in hydrocarbon and ethereal solvents such as $C_7H_{16}$, $C_6H_6$, and THF. The compounds of this invention however have moderate to high solubility in these solvents and this fact would make them useful for sol-gel and other solvent or solution based processes for making superconductors and other devices. Additionally, these compounds (in solution) decompose on exposure to light. The Cu III ion is one likely photolysis product (disproportionation: Cu II→Cu I+Cu III) of these compounds. Cu III may also be produced by the oxidation of the compounds. There are few Cu III compounds known and Cu III alkoxides should have application in the synthesis of Y-Ba-Cu-O superconductors as these superconductors contain both Cu II and Cu III.

Having described the invention, the following examples are given to illustrate specific applications of the invention including the best mode now known to perform the invention. These specific examples are not intended to limit the scope of the invention described in this application.

EXAMPLE 1

$BaCu_2(OCMe_3)6$ $BaBr_2$ (0.24 g, 0.81 mmol) was mixed in THF with $NaCu(OCMe_3)_3$ (0.5 g, 1.6 mmol). After stirring at 67° C. for 4 days the mixture was filtered and the filtrate evaporated to a yellow-green material (0.53 g). An attempt to sublime 0.035 g at 133°-160° C. resulted in 1.8 mg of sublimate (the rest decomposed); sublimate contains Cu:Ba:Na 5:2:1 by ICP. Crystallization from heptane/benzene/THF yields 0.15 g $BaCu_2(OCMe_3)_6$. Anal. Calc (Found) for $C_{24}H_{54}BaCu_2O_6$: C, 41.00 (41.10); H, 7.74 (7.84); Ba, 19.53 (19.73); Cu, 18.07 (17.99); Na, 0 (<0.20).

EXAMPLE 2

$NaCu(OCMe_3)_3$ $CuCl_2$ (4.7 g, 35.0 mmol) and $Me_3CONa$ (10 g, 104 mmol) was mixed in a 100 mL bulb with ≈90 mL THF. Reaction was stirred at 60°-80° C. for 4 days while protected from light. Filtered cold, then solid was sublimed in several portions (110°-120° C.), 4.77 g (45%) collected. Anal. Calc. (Found) for C12H27CuNaO3: C, 47.12 (47.20); H, 8.90 (8.94); Na 7.52 (7.24); Cu, 20.77 (20.83). Green solid is soluble in THF and other organic solvents. Sublimes 70°-110° C.

CVD with $NaCu(OCMe_3)_3$

A vacuum CVD apparatus, as illustrated in FIG. 1, was loaded with 55 mg $NaCu(OCMe_3)_3$. With substrate (Si) temperature ≈500° C., immersion in a 100° C. air bath resulted in deposition. Deposition time 5 minutes. Auger analysis shows primarily C with some Cu and traces of O and Na.

This deposition was repeated in a system in a system illustrated in FIG. 3 where the substrate temperature was 400° C., the oil bath was 135° C., the deposition time was 15 minutes and the argon flow rate was adjusted until the system pressure was 30-50 torr. A film of ≈1200 Å thickness with an Auger spectrum indicating Cu, Na, O and very little carbon was produced. The nature of the film provided is very sensitive to deposition conditions.

Obviously, many modifications and variations of the present invention are possible in light of the above teachings. It is therefore to be understood that, within the scope of the appended claims, the invention may be practiced otherwise than as specifically described.

What I claim is:

1. A copper-containing double metal alkoxide compound suitable for use as a precursor in a chemical vapor deposition process wherein a coating of metal oxide is deposited on a substrate having the formula:

$$M_yCu_z(OR)_{2(y+z)}$$

wherein M is selected from the group consisting of Ba, Sr and Ca, y is a whole integer from 1 to 4, z is a whole integer from 1 to 6, and R is selected from the group consisting of $CMe_3$, $CMe_2Et$, $CMeEt_2$, $CMe_2Pr$, CMeEtPr, $CEt_3$ and combinations of the above.

2. A compound according to claim 1 having the formula $MCu(OCMe_3)_4$.

3. A compound according to claim 1 having the formula $MCu_2(OCMe_3)_6$.

4. A compound according to claim 1 having the formula $BaCu(OCMe_3)_4$.

5. A compound according to claim 1 having the formula $BaCu_2(OCMe_3)_6$.

6. A copper-containing double metal alkoxide compound suitable for use as a precursor in a chemical vapor deposition process wherein a coating of metal oxide is deposited on a substrate having the formula:

$$M'_xCu_z(OR)_{x+2z}$$

wherein M' is an alkali metal, x is a whole integer from 1 to 6, z is a whole integer from 1 to 6, and R is selected from the group consisting of $CMe_3$, $CMe_2Et$, $CMeEt_2$, $CMe_2Pr$, CMeEtPr, $CEt_3$ and combinations of the above.

7. A compound according to claim 6 wherein M' is Na.

8. A compound according to claim 6 having the formula $M'Cu(OCMe_3)_3$.

9. A compound according to claim 6 having the formula $M'Cu(OCEt_3)(OCMe_3)_2$.

10. A compound according to claim 6 having the formula $NaCu(OCMe_3)_3$.

11. A compound according to claim 6 having the formula $NaCu(OCEt_3)(OCMe_3)_2$.

* * * * *